(12) United States Patent
Raffaelli et al.

(10) Patent No.: US 12,434,785 B2
(45) Date of Patent: Oct. 7, 2025

(54) SADDLE-RIDING TYPE ROLLING MOTOR VEHICLE WITH A NOT-ROLLING FRONT FAIRING

(71) Applicant: PIAGGIO & C. S.P.A., Pontedera (IT)

(72) Inventors: Andrea Raffaelli, Pontedera (IT); Mario Donato Santucci, Pontedera (IT)

(73) Assignee: Piaggio & C. S.p.A., Pontedera (IT)

( * ) Notice: Subject to any disclaimer, the term of this patent is extended or adjusted under 35 U.S.C. 154(b) by 0 days.

(21) Appl. No.: 18/561,691

(22) PCT Filed: Jun. 9, 2022

(86) PCT No.: PCT/IB2022/055373
§ 371 (c)(1),
(2) Date: Nov. 16, 2023

(87) PCT Pub. No.: WO2022/259199
PCT Pub. Date: Dec. 15, 2022

(65) Prior Publication Data
US 2024/0253726 A1    Aug. 1, 2024

(30) Foreign Application Priority Data
Jun. 11, 2021   (IT) .................. 102021000015341

(51) Int. Cl.
*B62K 5/10* (2013.01)
*B62J 6/023* (2020.01)
(Continued)

(52) U.S. Cl.
CPC ............... *B62K 5/10* (2013.01); *B62J 6/023* (2020.02); *B62J 17/04* (2013.01); *B62K 5/027* (2013.01); *B62K 5/05* (2013.01); *B62K 5/08* (2013.01)

(58) Field of Classification Search
CPC . B62K 5/10; B62K 5/027; B62K 5/05; B62K 5/08; B62J 6/023; B62J 17/04
See application file for complete search history.

(56) References Cited

U.S. PATENT DOCUMENTS 9,758,207 B2 *  9/2017  Iizuka ................. B62K 5/08
2007/0075514 A1  4/2007  Saiki
(Continued)

FOREIGN PATENT DOCUMENTS

EP      3341274 B1     6/2019
JP   2021020595 A  *  2/2021
(Continued)

OTHER PUBLICATIONS

Hirayama, WO-2015002173-A1, Machine Translation of Specification (Year: 2015).*

(Continued)

*Primary Examiner* — Paul N Dickson
*Assistant Examiner* — Matthew Joseph Ganci
(74) *Attorney, Agent, or Firm* — Patterson Intellectual Property Law, PC (57) ABSTRACT

A saddle-riding type motor vehicle comprises steerable and rollable front wheels, a drive rolling wheel, an articulated rolling quadrilateral connected to a frame, and a steering assembly pivotably connected to the frame to control the front wheels. A suspension assembly is interposed between the front wheels and the quadrilateral to allow a sussultatory movement of the wheels with respect to the quadrilateral. The latter comprises lower and upper cross-members hinged to the frame to oscillate about rolling median axes parallel and substantially lying on a center plane of the motor vehicle. The articulated rolling quadrilateral further comprises first and second uprights hinged to the cross-members to rotate about further rolling axes parallel to the median rolling axes. A front-end fairing is directly and rigidly connected to one of the cross-members of the articulated roll quadrilateral, and comprises two wheel arch portions arranged above the front wheels.

14 Claims, 7 Drawing Sheets

(51) Int. Cl.
*B62J 17/04* (2006.01)
*B62K 5/027* (2013.01)
*B62K 5/05* (2013.01)
*B62K 5/08* (2006.01)

(56) References Cited

U.S. PATENT DOCUMENTS

2007/0256882 A1* 11/2007 Bedard .................. B62K 5/027
 180/312
2014/0136076 A1* 5/2014 Novak ..................... B62J 17/02
 701/99

FOREIGN PATENT DOCUMENTS

WO WO-2015002173 A1 * 1/2015 ................ B62J 6/00
WO WO-2019123146 A1 * 6/2019 .............. B62J 6/023

OTHER PUBLICATIONS

Handa, JP-2021020595-A, Machine Translation of Specification (Year: 2021).*

* cited by examiner

SADDLE-RIDING TYPE ROLLING MOTOR VEHICLE WITH A NOT-ROLLING FRONT FAIRING

TECHNICAL FIELD

The present invention falls within the field of production of rolling motor vehicles, i.e. motor vehicles provided with a rolling movement around a median plane that develops longitudinally along the vehicle. In particular, the invention concerns a rolling vehicle, with three or four wheels, in which the fairing in the front-end part is not rolling, namely not subject to rolling movements while the vehicle is in motion.

STATE OF THE ART

The various types of vehicles currently on the market include three-wheel vehicles in which the two front wheels are steering wheels and the rear wheel is the driving wheel. In these vehicles, the two front wheels are connected to the frame of the vehicle so as to be inclinable or tilting laterally, following a rolling movement around an axis oriented according to the direction of motion and lying on a median plane of the vehicle that develops longitudinally.

Figure 1:
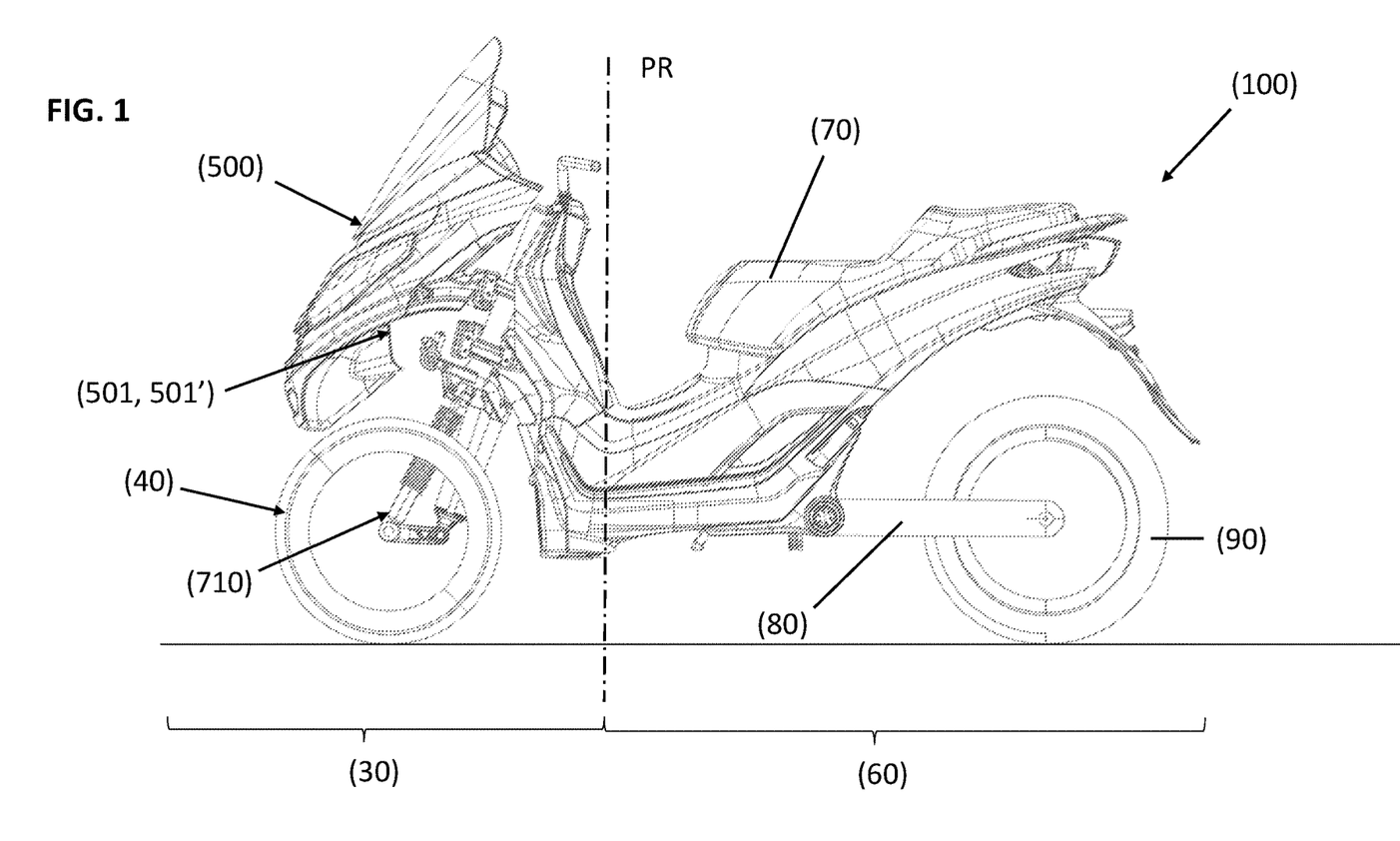
FIGS. 1 to 3 are views relative to a rolling motorcycle of known type.
Figures 2, 3:
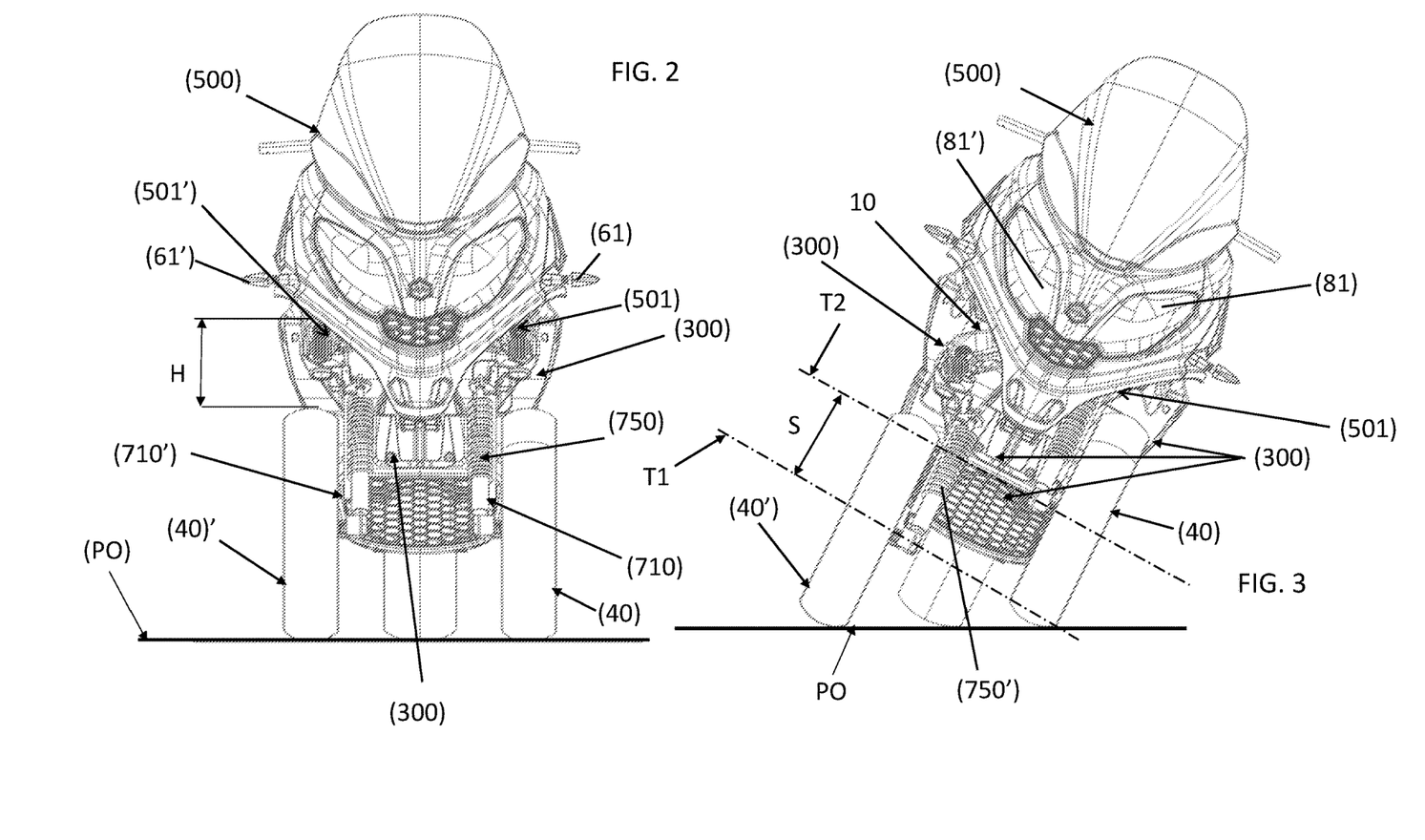

FIGS. 1 to 3 refer to a rolling motor vehicle (100) with three wheels of known type. The motor vehicle (100) comprises a front-end part (30) and a rear-end part (60) that supports a saddle (70) and a driving wheel (90) through an oscillating fork (80) oscillating around a transverse axis. The front-end part (30) comprises a front fairing (500), said term indicating the rigid covering or shell installed to reduce the motor vehicle's resistance to air when in motion. As is known, the front fairing (500) is designed with an aerodynamic profile adapted to reduce the air resistance coefficient and therefore facilitate an increase in speed and at the same time reduction in fuel consumption. It is also known that the front fairing (500) comprises two wheel arch portions (501, 501') defined above the front wheels (40, 40') in a substantially symmetrical position with respect to a centre line plane A-A of the vehicle.

With reference in particular to FIG. 2, to allow rolling of the front wheels, an articulated quadrilateral mechanism is usually provided, interposed between the front wheels and a front part of the frame. Typically, the quadrilateral mechanism comprises a pair of cross members, each of which is hinged to the frame at the longitudinal centre line plane, so as to oscillate around parallel axes. The quadrilateral mechanism further comprises a pair of uprights for each of which the two ends are hinged to a corresponding one of the two cross members, defining rotation axes that are parallel to those of the cross members with respect to the frame. The two uprights are connected to a support element of the wheel so that the latter can rotate around a steering axis, where the steering movement is controlled by a steering system operatively independent from the quadrilateral mechanism.

Again with reference to FIG. 2, the motor vehicle (100) comprises a suspension assembly that includes, for each front wheel (40, 40'), suspension means interposed between the wheel and the corresponding upright of the quadrilateral mechanism. For each front wheel (40, 40') the corresponding suspension means comprise at least one shock absorber (750, 750') that allows the sussultatory movement of said front wheels (40, 40') with respect to said quadrilateral mechanism (10).

In this regard, FIG. 3 shows the motor vehicle (100) during a rolling movement whereby the same is inclined to the right considering the plane of the page. However, considering the position of the rider on the saddle and therefore his/her point of view, the condition of FIG. 3 derives from an inclination of the vehicle towards the left. As it can be seen, during the rolling, the front fairing (500) tilts integral with the frame of the motor vehicle so that the right-hand wheel housing portion is in a position substantially adjacent to the front right-hand wheel, while the left-hand wheel housing portion is in the maximum distal position from the left-hand wheel. It follows that the axes of rotation of the front wheels lie on spaced planes T1, T2 (orthogonal to the centre line plane A-A), the distance (or displacement S) of which increases as the rolling angle increases. These conditions are determined by the kinematics of the quadrilateral mechanism and in particular by the oscillation around the longitudinal axes to which the two cross members are subjected as a result of the rolling movements.

In the absence of rolling, the extent of the relative movement (approaching-moving away) of the wheel portions (501, 501') with respect to the corresponding front wheels (40, 40') is determined solely by the behaviour (lengthening/shortening) of the shock absorbers (750, 750'), namely by the sussultatory movement of the front wheels (40, 40'). Adding the rolling, the extent of said movement depends not only on the shock absorbers (750, 750') but also on the inclination of the front wheels (40, 40'), i.e. on the displacement between the axes of said wheels determined by the extent of the rolling.

Therefore the fairing (500) is configured and installed on the front-end frame so that the wheel housing arch (501, 501') are located at a pre-defined height (indicated in FIG. 2 by the reference H) with respect to the front wheels (40, 40'), where said height is considered in the absence of rolling and suspensions fully extended with respect to the front wheels. The value of said height (H) shall necessarily be greater than or equal to the sum of the stroke permitted by the shock absorbers and half of the maximum displacement (S) between the front wheels (40, 40').

It has been seen that the need to guarantee this height (H) significantly conditions the design of the fairing and represents a limit to the aerodynamic effect provided by the latter. In fact, due to the vertical distance from the front wheels, and consequently from the support surface (PO) of the motor vehicle, the fairing can develop only in a region near to or above the handlebar. Therefore, as can be seen in the front views in FIGS. 2 and 3, different parts of the front-end part (indicated by 300) remain "exposed", i.e. not covered by the fairing. Said regions are obviously critical in aerodynamic terms.

As known, in almost all cases, the fairing (500) also has to support and/or integrate other components useful for operation of the motor vehicle (100) including the headlights (810, 810') used to light the road surface when the motor vehicle (100) is in motion. On the one hand, the need to arrange the wheel arch portions at a certain height limits the space useful for the development of the fairing (500), on the other the design of the latter is also complicated by the need to support/integrate the lighting devices indicated above, and any other accessories useful for the operation thereof.

In this regard, since the headlights (810, 810') are integral with the fairing (500), they follow its movements in all operating conditions and therefore also during the rolling movements. When the motor vehicle (100) tilts due to the rolling effect (FIG. 3), the visual field illuminated by the headlights is restricted or in any case is impaired compared to when the vehicle is straight. To solve this problem, complicated systems for orientation of the headlight bulbs have been proposed that move them with respect to the fairing to maintain constant illumination also during the rolling movements. These systems have proved to be complicated, costly and difficult to apply and in any case contribute to the difficulty of designing the fairing.

Apart from the limits indicated above connected with the "high" installation position with respect to the front wheels, the sole fact that the fairing tilts with the frame during the rolling movements is an aspect that alone negatively affects the aerodynamic behaviour during the rolling phase. From a comparison between FIGS. 2 and 3 it is evident that, after the rolling, the profile of the vehicle, evaluated on the frontal plane, changes completely. Also the aerodynamic behaviour of the motor vehicle consequently changes.

In view of the above, the Applicant has therefore ascertained the need to provide a solution that allows improvement in the aerodynamic behaviour of a three-wheel rolling vehicle and which is applicable also to a four-wheel rolling vehicle.

SUMMARY

The main task of the present invention is to provide a rolling motorcycle that overcomes the drawbacks described above. In the context of this task, a first object is to provide a rolling motorcycle, with three or four wheels, that has substantially the same aerodynamic behaviour in any operating conditions. A further object of the present invention is to provide a rolling motorcycle with reference to which the design of the vehicle front fairing is simplified, but which at the same time can result in a more effective aerodynamic profile. A further object is to provide a solution that improves the behaviour of the lighting devices (headlights) associated with the front fairing without the aid of orientation devices and/or other devices with similar purposes. Last but not least, another object of the present invention is to provide a rolling motorcycle with three or four wheels that can be easily produced at competitive costs.

The Applicant has ascertained that the task and the objects indicated above can be achieved by connecting the front fairing to one of the two cross members of the articulated quadrilateral, therefore freeing the fairing from the motor motorcycle frame. In this way, the fairing follows the movements of the cross member to which it is connected and, due to the kinematics of the quadrilateral, it keeps substantially unchanged its orientation with respect to the surface on which the motor vehicle rests. The fact that the front fairing is not rolling means that in practice it is possible to reduce the height at which the wheel arch portions are located with respect to the front wheels. Consequently, the design of the fairing is easier and more effective, with the advantage of improved aerodynamic behaviour of the motor vehicle.

In particular, the Applicant has ascertained that the task and the objects indicated can be achieved via a saddle-riding motorcycle comprising at least two steering and rolling front wheels and at least one rolling driving wheel, in which said motorcycle further comprises:
a frame;
a motor assembly supported by a rear part of the frame;
an articulated rolling quadrilateral connected to a front part of the frame, wherein the articulated rolling quadrilateral supports a first front wheel and a second front wheel so as to allow the first front wheel and the second front wheel a rolling movement;
a steering assembly rotatably connected to the front part of the frame to control the front wheels, wherein the steering assembly acts on said support elements to steer the front wheels;
a suspension assembly interposed between the front wheels and the articulated rolling quadrilateral to allow a sussultatory movement of said wheels with respect to the articulated rolling quadrilateral.

According to the invention, the articulated rolling quadrilateral comprises a lower cross member and an upper cross member hinged to the front part of the frame so as to oscillate about median rolling axes parallel and substantially lying on a center plane of the motorcycle. The articulated rolling quadrilateral further comprises a first upright and a second upright hinged to the cross members so as to rotate about further rolling axes parallel to said median rolling axes.

In the motorcycle according to the invention it is provided a front fairing directly and rigidly connected to one of said cross-members of said articulated rolling quadrilateral; further, said front fairing comprises two wheel arch portions arranged above said front wheels.

In accordance to a possible embodiment, the motorcycle comprises an electric energy source directly or indirectly connected to the frame, wherein said front fairing supports at least one headlight so that it follows the movements of said one cross member to which said fairing is connected, and wherein at least an electric cable connects said electric energy source to said headlight.

Preferably, said electric cable passes at or near said median rolling axes of the respective cross member to which said front fairing is directly and rigidly connected.

In accordance to a possible embodiment, said front fairing comprises two direction indicators.

In accordance to a possible embodiment, respective supply electrical cables are provided to connect said direction indicators to said electric energy source, wherein said supply electrical cables pass at or near the median rolling axes of the corresponding cross member to which said front fairing is directly and rigidly connected.

In accordance with a possible embodiment, the front fairing is cantileverly-connected to said one of said cross members by means of a connecting frame.

In accordance with another possible embodiment, wherein said front fairing is exclusively connected to said one of said cross members.

In accordance with another possible embodiment, the motorcycle comprises a dashboard that includes an odometer connected to the frame so as to roll with it.

In accordance with a possible embodiment, a windscreen is connected to the frame so as to roll with it.

In accordance with a preferred embodiment, the height from soil of the front fairing when the motorcycle is in an erect position is lower than the height of the top of the handlebar, wherein said heights are evaluated from a support surface of the motorcycle.

In a possible embodiment, said front fairing comprises a housing to contain objects, preferably a helmet.

In accordance with a possible embodiment, the distance between the front fairing and the front wheels is exclusively a function of the stroke allowed by the suspension assembly.

LIST OF FIGURES

Further characteristics and advantages of the invention will become evident from examination of the following detailed disclosure of some preferred but non-exclusive embodiments of the motorcycle, illustrated by way of indicative non-limiting example, with the support of the attached drawings, in which.

The same reference numbers and letters in the figures identify the same elements or components.

DETAILED DISCLOSURE

With reference to the cited figures, the present invention therefore concerns a saddle-riding motorcycle of the type comprising at least two steering and rolling front wheels 4, 4' and at least one driving and rolling rear wheel 9. This definition therefore also comprises four-wheel motor motorcycle comprising two steering front wheels and two driving and rolling rear wheels. In the following description, the motorcycle 1 will be indicated also with the more generic expression motor vehicle 1.

For the purposes of the present invention, the expression "longitudinal direction" or "front-back direction" indicates a direction parallel to the direction of forward movement of the vehicle 1 and orthogonal to the rotation axis M of the driving wheel 9, while the expression "transverse direction" or "right-left direction" indicates a direction substantially orthogonal to the longitudinal direction and parallel to the rotation axis M of the driving wheel 9. Lastly, the expression "normal direction" or "up-down direction" indicates a direction orthogonal to the longitudinal direction L and the transverse direction. The FIGS. 4 to 8 comprise Cartesian reference axes indicating the front-back direction F-B, the up-down direction U-D and the right-left direction R-L defined above.

Moreover, the terms "longitudinally or longitudinal", the terms "transversely or transverse" and the terms "normally or normal" refer to the longitudinal direction (namely frontback F-B), to the transverse direction (namely right-left R-L) and to the normal direction N (namely up-down U-D) respectively. The terms "frontally", "on the right" and "at the top" refer to the directions indicated by the arrows of the half-lines F, R. U that can be seen in the figures. The terms "at the rear", "on the left" and "at the bottom" indicate directions opposite to those indicated by the arrows of the half-lines B, L and D.

Figure 5:
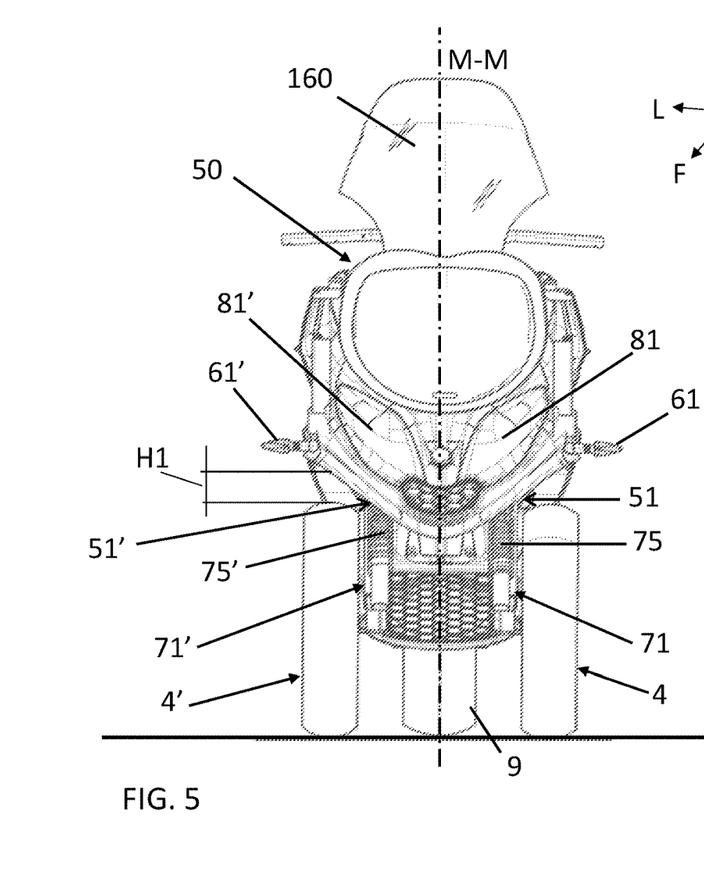
Figure 6:
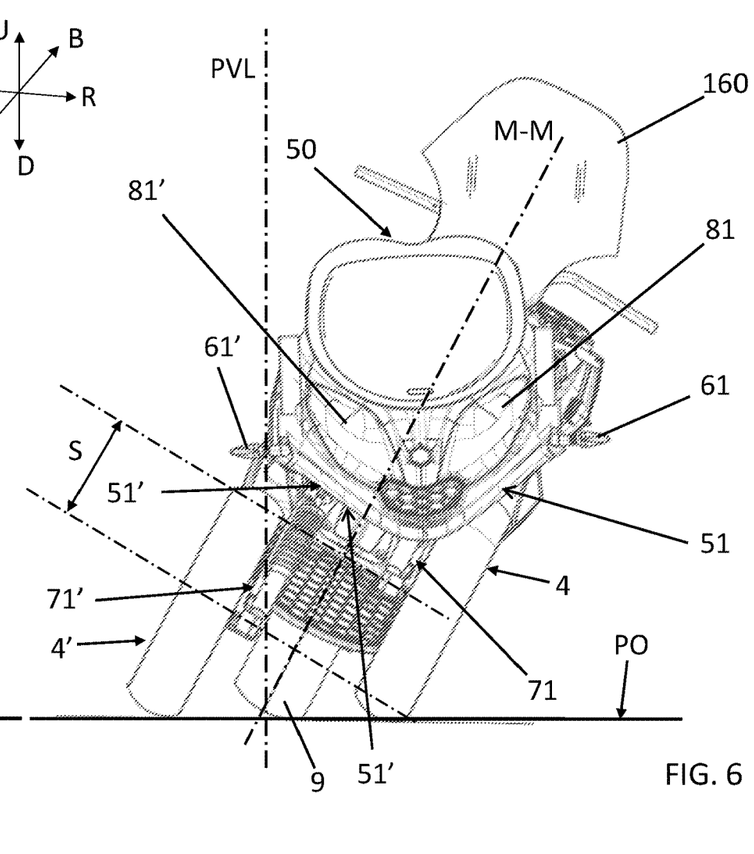
FIG. 6 is a frontal view of the vehicle of FIG. 5 during a rolling movement.

In the FIGS. 5 and 6 a longitudinal centre line plane A-A of the vehicle 1 is indicated. Said plane A-A extends mainly in the front-back F-B direction of the motor vehicle 1 and, in the absence of rolling movements, is orthogonal to the right-left R-L direction, i.e. to the rotation axis M of the driving wheel 9.

The center plane A-A divides the motor vehicle 1 into two semi-portions: a right-hand semi-portion and a left-hand semi-portion. In FIGS. 5 to 10 and in the following part of the description, the components, assemblies or elements symmetrical with respect to the center plane A-A are indicated by the same reference number followed by a superscript (') if the component, assembly or element is arranged on the left side of the center plane A-A, wherein said sides (right and left) are considered on the plane of the page of FIGS. 5 and 6.

With reference to FIG. 6, the reference PVL indicates a substantially vertical longitudinal reference plane that coincides with the center line plane M-M when the motor vehicle 1 is not subject to rolling. In the following part of the description, the expression "condition with straight wheels" indicates a state of the motor vehicle 1 in which there are no steering or rolling movements (condition shown in FIG. 5).

The motor vehicle 1 comprises a frame 2A-2B the structure of which develops mainly in the front-back F-B direction of the motor vehicle 1. The frame 2A-2B comprises a front part 2A and a rear part 2B which support the front-end 3 and the rear-end 5 respectively of the motor vehicle 1. For the purposes of the present invention, the term "front-end 3" indicates the part of the motor vehicle 1 at the front of a vertical reference plane 300 passing through the most rear part of the handlebar 66 of the motor vehicle 1, i.e. the point nearest the rear wheel 9 (see FIG. 4). The term "rear-end 6" indicates the part of the motor vehicle 1 at the rear of said reference plane 300.

The rear part 2B of the frame 2A-2B supports a motor assembly (not illustrated) comprising at least an engine to generate the driving force for propelling the motor vehicle 1 and at least one transmission, generically indicating the set of components that transfer said driving force from the engine to the rear wheel 9. In the rear-end 6 of the motor vehicle 1 a swingarm 8 is also provided, hinged, at one first end, to the rear part 2B of the frame 2A-2B according to a solution known per se. The swingarm 8 supports, at a second end, said at least one driving wheel 9. Between the rear part 2B of the frame 2A-2B, shock absorber means (not illustrated) are arranged according to a widely known principle.

In general, the configuration of the motor assembly is not relevant for the purposes of the present invention. In fact, the motor could be an internal combustion engine or an electric motor and, in any case, have configurations and operating principles widely known per se. In one embodiment, the motor assembly could be of hybrid type, i.e., comprising both an internal combustion engine and an electric motor which cooperate to propel the vehicle according to principles widely known per se. Therefore, for the purposes of the present invention, the configuration of the transmission indicated above is not relevant.

Figure 7:
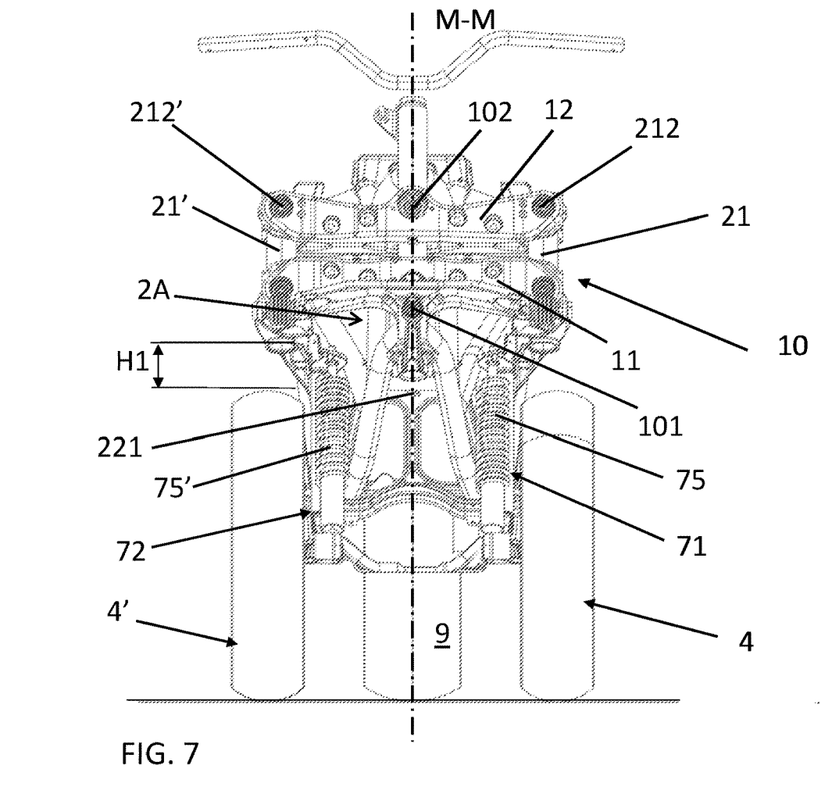
FIG. 7 is a frontal view of the motorcycle in FIG. 5 without the fairing in the front-end part.
Figure 8:
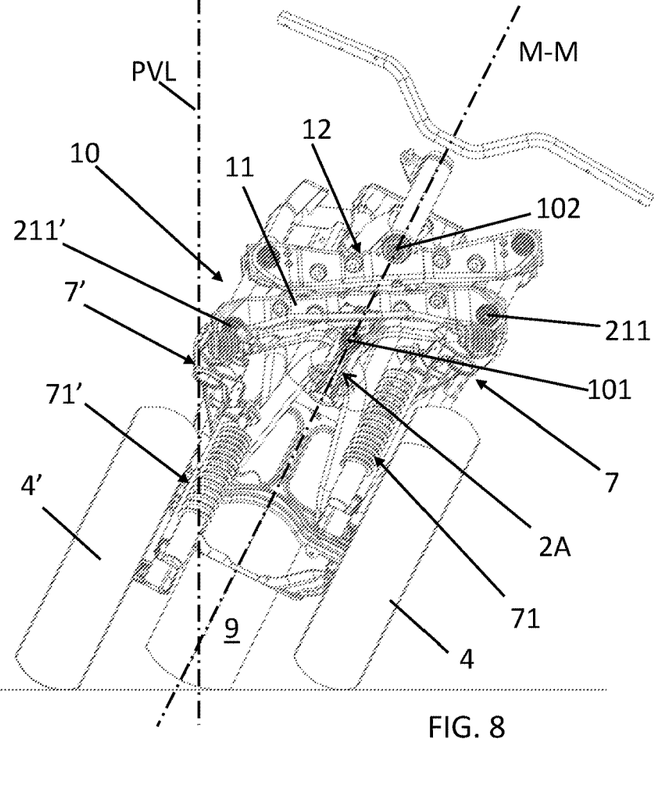
FIG. 8 is a lateral view of the motorcycle in FIG. 5, without the front-end fairing during the rolling movement corresponding to the one shown in FIG. 6.

The front-end 3 of the motor vehicle 1 comprises a articulated rolling quadrilateral, indicated generically by the reference 10 and with reference to which a possible embodiment is shown in FIGS. 7 and 8. The quadrilateral 10 comprises a lower cross member 11 (or first cross member 11) and an upper cross member 12 (or second cross member 12) hinged to a front portion 221 of the front part 2A of the frame 2A-2B so as to oscillate around median rolling axes 101, 102 (defined by rolling hinges), wherein said median rolling axes 101, 102 are longitudinal and lie on the centre line plane A-A indicated above. In particular, for the purposes of the invention, the terms "lower" and "upper" used to distinguish the two cross members 11, 12 of the quadrilateral 10 refer solely to the position of the points at which said cross members 11, 12 are hinged to the front part 2A of the frame 2A-2B, wherein said position is evaluated in the condition of vehicle with straight wheels and in the up-down direction U-D.

The quadrilateral 10 also comprises a first upright 21 and a second upright 21' (indicated in FIG. 7) hinged to the cross members 11,12 so as to rotate around corresponding further rolling axes (defined by further rolling hinges 211, 211', 212, 212') parallel to said median rolling axes. In particular, each upright 21, 21' is hinged to the upper cross member 12 so as to rotate around an upper axis (rolling hinges 212, 212') and is hinged to the lower cross member 11 so as to rotate around a lower lateral axis (rolling hinges 211, 211').

The two cross members 11, 12 extend transversely so that the upper axes (rolling hinges 212, 212') are arranged symmetrically with respect to the centre line plane A-A. Similarly, also the lower axes (rolling hinges 211, 211') are symmetrical with respect to the same plane A-A. This arrangement defines the quadrilateral geometry necessary to follow the rolling movement of the motor vehicle 1. The "symmetrical" position is evaluated in the condition of vehicle with straight wheels.

Each of the uprights 21, 21' of the quadrilateral 10 is associated with a support element 7, 7' (see FIG. 8) which supports, directly or indirectly, a corresponding front wheel 4, 4'. More precisely, a first support element 7 is associated with the first upright 21 and supports a first front wheel 4, while a second support element 7' is associated with the first upright 21' and supports a second front wheel 4'. The two support elements 7, 7' are free to rotate with respect to the corresponding upright 21, 21' around a corresponding steering axis (not indicated in the figures) of the corresponding front wheel 4, 4'. The two steering axes of the front wheels 4, 4' are parallel to each other and arranged symmetrically with respect to the centre line plane A-A.

The front-end 3 of the motor vehicle 1 also comprises a steering assembly (not illustrated) to control the steering of the two front wheels 4, 4'. In particular, in accordance with a widely known solution, the steering assembly acts on the two support elements 7, 7' determining a rotation thereof around corresponding steering axes 301, 301'. The steering assembly is activated by rotation of the handlebar 66 of the motor vehicle 1 which is also part of the front-end 3.

The front-end 3 further comprises a suspension assembly operatively interposed between the front wheels 4, 4 and the quadrilateral 10 so as to allow a sussultatory movement of the wheels with respect to the quadrilateral. More precisely, the suspension assembly comprises first suspension means 71 operatively associated with the first front wheel 4 and second suspension means 71' operatively associated with the second front wheel 4'. The expression "operatively associated" indicates that said first means and said second means are operatively interposed between the corresponding front wheel 4, 4' and the corresponding upright 21, 21' of the quadrilateral 10 to allow raising and lowering of the wheel (i.e., the sussultatory movement).

The first suspension means 71 and the second suspension means 71' comprise at least one shock absorber element 75, 75' which damps, in accordance with a widely known principle, the relative movement of the corresponding front wheel 4, 4' with respect to the quadrilateral 10. In general, the support elements 7, 7' of the front wheels 4, 4', connected rotatably to the uprights 21, 21' of the quadrilateral 10, can directly or indirectly support the corresponding front wheel 4, 4', according to the configuration of the suspension means 71, 72' provided. For the purposes of the present invention, the expression "shock absorber element" generically indicates an assembly formed of a damping component (i.e. that provides a viscous damping) and an elastic component (spring), where said components are coaxial.

Figure 4:
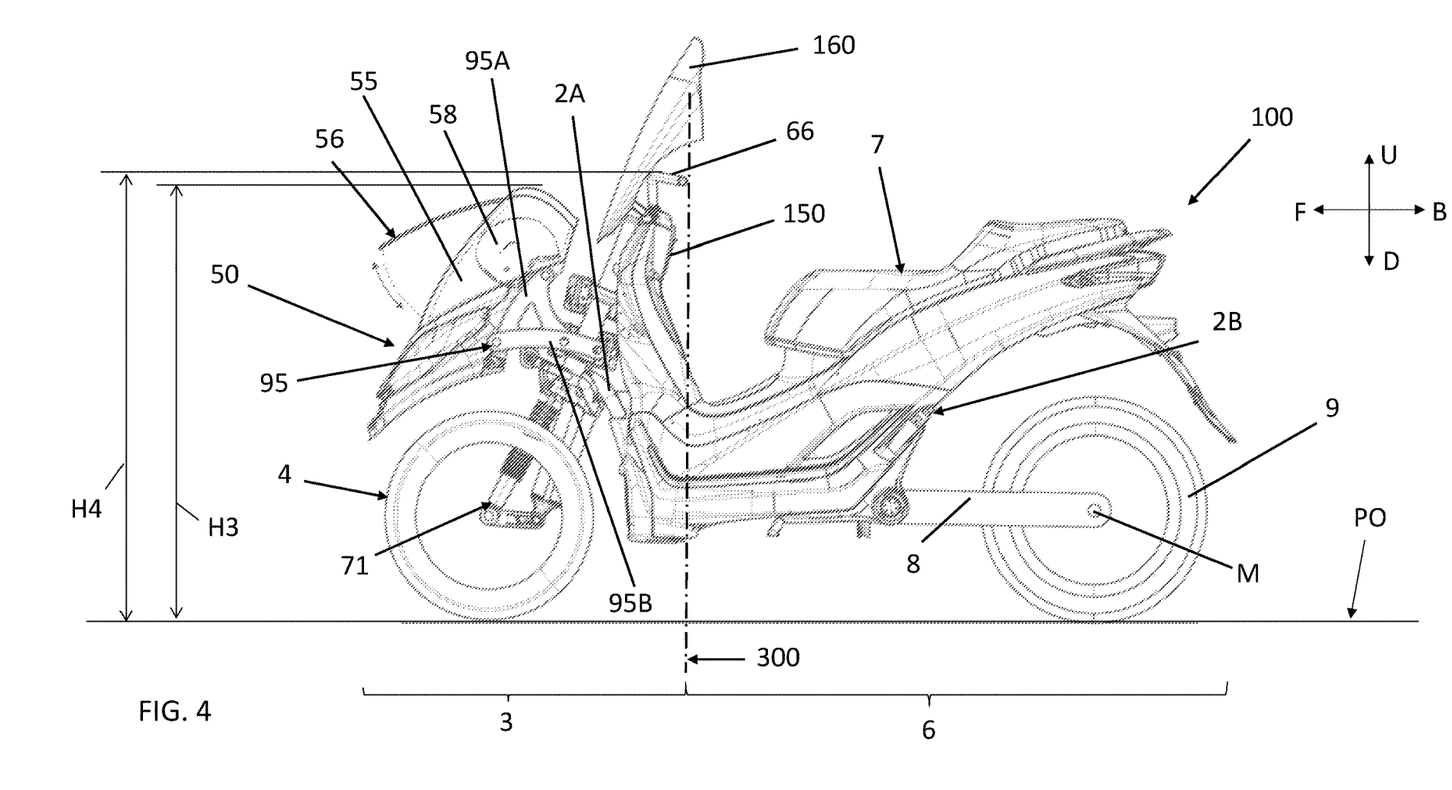
FIGS. 4 and 5 are a lateral view and a frontal view respectively of a three-wheel rolling motorcycle according to the present invention in a condition of absence of rolling.

With reference to FIGS. 4 to 6, the front-end 3 comprises a front fairing 50 (or front-end fairing 50). As already mentioned above, this expression indicates the rigid covering or shell designed to reduce the air resistance encountered by the motor vehicle 1 during motion. The profile of the front-end fairing 50 therefore establishes the aerodynamic behaviour of the motor vehicle 1 during motion.

According to the present invention, the front-end fairing 50 is connected to one of the cross members 11, 12 of the rolling quadrilateral 10 and by means of the same to the front part 2A of the frame. In other words, the fairing 50 is rigidly connected to one of the two cross members 11, 12 and is therefore free from the frame 2A-2B. Contrarily to the solutions of the known art, the front fairing 50 is not subject to any rolling movement because it is integral with one of the cross members 11, 12. In fact, due to the kinematics of the quadrilateral mechanism 10, like the two cross members 11, 12, also the front fairing 50 always maintains the same orientation (substantially horizontal) with respect to the support surface PO of the motor vehicle 1, lowering or raising (i.e. moving towards or away from the support surface PO) with the cross member to which it is connected. The extent of said movement corresponds to the extent of the rolling, i.e., the inclination of the uprights 21, 21' of the quadrilateral mechanism 10, namely of the front wheels 4, 4'.

This behaviour can be seen from FIGS. 5 and 6 which show the motor vehicle 1 in the absence and presence of rolling respectively. In particular, in the case of FIG. 6, the rolling is configured as an inclination of the motor vehicle 1 on the right-hand front wheel 4 (considering the plane of the page of FIG. 6), but the same conditions apply also to inclination on the left-hand front wheel 4' (again considering the plane of the page of FIG. 6). In fact, regardless of the rolling direction, all the parts of the motor vehicle 1 are inclined towards the support surface PO, except for the two cross members 11, 12 (see also FIG. 8) and the fairing 50 integral with one of them. Advantageously, the fact that the fairing 50 does not rotate around a longitudinal axis results in an aerodynamic profile of the motor vehicle 1 that remains substantially constant, independently of the trajectory (straight or curved) of the motion.

With reference again to FIGS. 5 and 6, the front-end fairing 50 comprises two wheel arch portions 51, 51' each of which are located above one of the corresponding front wheels 4, 4' when the motor vehicle 1 is in a condition of absence of rolling (FIG. 5). In particular, in one preferred embodiment, the wheel arch portions 51, 51' are located at a height H1, the value of which is between a first reference value corresponding to the stroke of the shock absorbers 75, 75', and a second reference value corresponding to the sum of the stroke of the shock absorbers 75, 75' and half of the maximum displacement S allowed between the axes of the front wheels 4, 4' due to the rolling.

In this regard, the height H1 of the wheel arch portions 51, 51' is evaluated in a condition of absence of rolling, as the vertical distance between a horizontal plane tangential to the front wheels 4, 4' and the wheel arch portions 51, 51', wherein said distance is evaluated from the highest point of the front wheels 4, 4'. The maximum displacement S indicated above is considered as the distance between the axes of the front wheels 4, 4' during the rolling, wherein said distance is evaluated according to a direction orthogonal to said axes.

Preferably, the height H1 defined above is within a range between the first reference value indicated above and a third reference value given by the sum of the stroke of the shock absorbers 75, 75' and half of the maximum displacement S allowed between the axes of the front wheels 4, 4' due to the rolling.

Advantageously, in a motor vehicle 1 according to the invention, the height H1 at which the wheel arch portions 51, 51' of the fairing 50 are located can be lower than the value established in the traditional solutions. In fact, due to the connection to one of the two cross members 11, 12 provided by the invention, the height H1 can advantageously depend only on the stroke of the shock absorbers 75, 75' of the suspension assembly. In other words, since the fairing 50 is no longer inclined with respect to the support surface PO, the displacement S between the axes of the front wheels 4, 4' during the rolling substantially does not affect the position in which the wheel arch portions 51, 51' can be located.

Comparing the known solution in FIGS. 1-3 with that of FIGS. 4-6, it can be seen that the aerodynamic behaviour of the motor vehicle 1 is improved. Indeed, following the reduction in the installation height H1 of the wheel arch portions 51, 51', the fairing 50 can be lowered, covering to a greater extent the suspension means 71, 72 associated with the front wheels 4, 4'. In fact, this solution allows the area of the frontal regions not covered by the fairing to be reduced.

In any case, with the same form and/or configuration as the other components of the motor vehicle 1, in particular those of the front-end 3, the connection of the front fairing 50 to one of the two cross members 11 or 12 allows the fairing to extend more above and/or frontally to the front wheels 4, 4'. The greater area available for the fairing 50 simplifies the design thereof. In this regard, also the positioning of lighting devices, preferably supported by the fairing, can be advantageously simplified and improved. Also the extension of the headlights can be advantageously increased.

In accordance with a possible embodiment, to connect the fairing 50 to the selected cross member (the lower cross member 11 or alternatively the upper cross member 12) a connecting frame 95 (indicated in FIG. 4) is provided comprising a plurality of structural elements 95A, 95B of which at least one 95A is connected to the fairing 50 and at least another 95B is connected to the selected cross member 11 or 12. Alternatively, the front fairing 50 could comprise shaped portions 151 (FIG. 10), schematically shown, provided to be fixed directly, or indirectly through an interface, to the selected cross member 11 or 12 through fixing means such as, for example, screws, bolts, brackets and other functionally equivalent means.

In accordance with a preferred embodiment, the front-end fairing 50 supports two headlights 81, 81' arranged symmetrically with respect to a center plane A-A of the motor vehicle 1. Due to the present invention, also the design and positioning of the headlights 81, 81' can be advantageously simplified and/or improved. Furthermore, with reference to FIGS. 5 and 6, it can be seen that the two headlights 81, 81', being integral with the front-end fairing 50, keep the same orientation with respect to the surface PO also during the rolling phase. This condition allows a constant field of illumination of the road surface also during rolling, with evident advantages in terms of safety.

Figure 9:
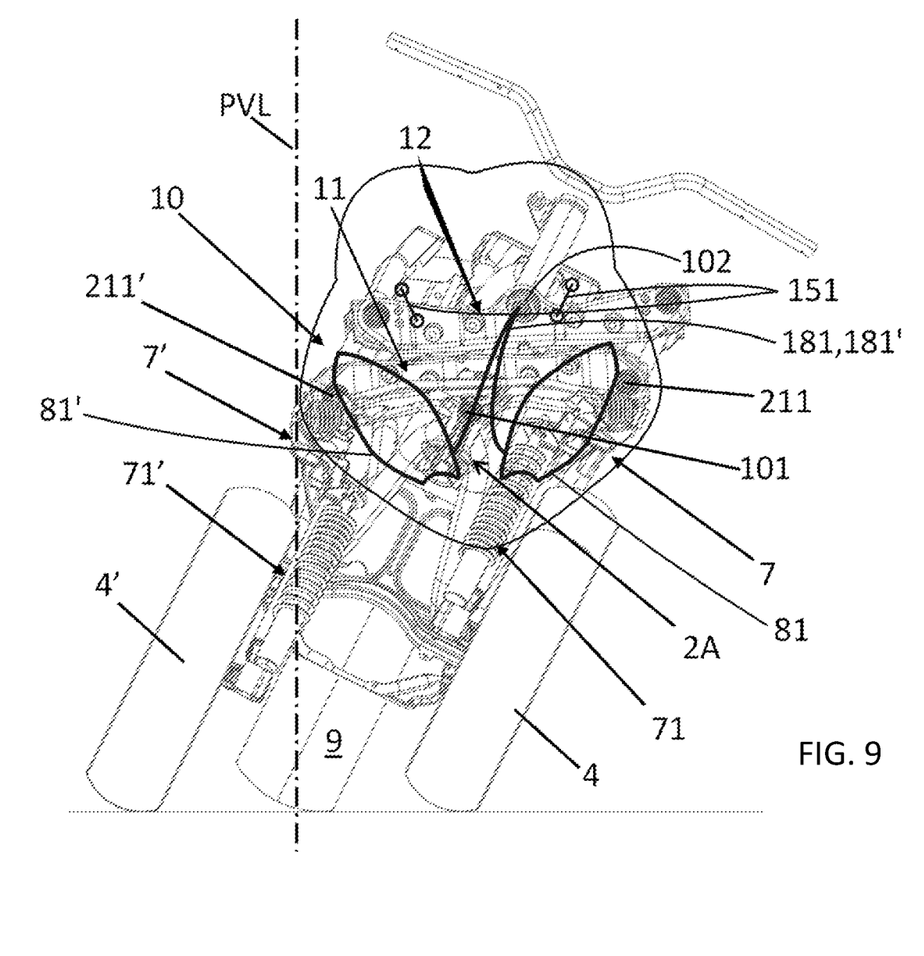
FIG. 9 is a front view of the motorcycle during a rolling movement, wherein the front fairing and the relative headlights are schematically shown.
Figure 10:
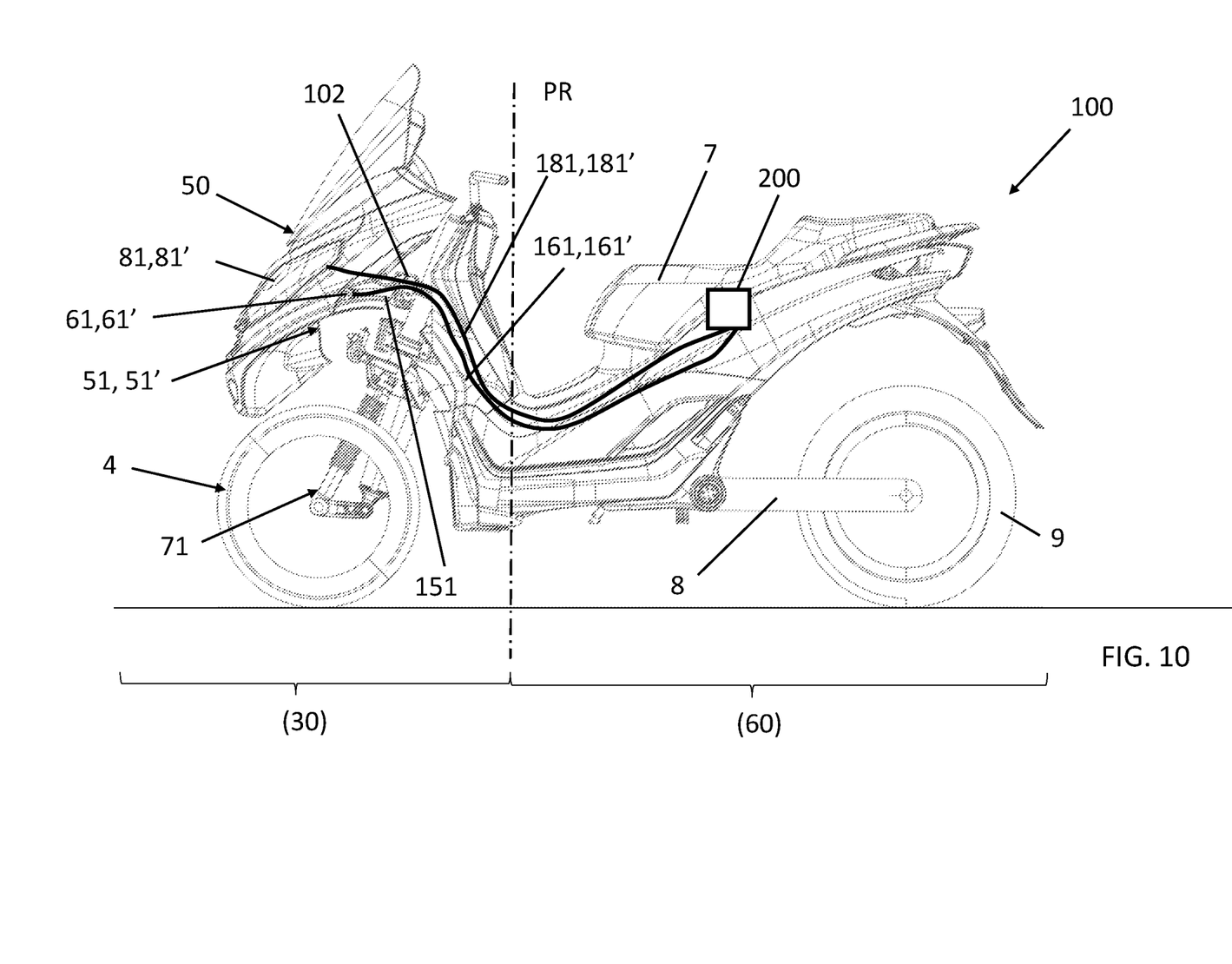
FIG. 10 is a lateral view of the motorcycle where an energy source and connecting cables, that connect the energy source to the front headlights and/or the front direction indicators, are shown, wherein the cables pass trough a median rolling hinge.

In particular, as shown in FIGS. 9 and 10, energy source 200 (FIG. 10), that is directly or indirectly connected to the chassis 2A-2B, is provided. The energy source 200 is, for example, the vehicle battery arranged under the seat 7. Hereinafter, the energy source will be indicated as battery 200.

There is further provided an electrical cable, in particular a pair of electrical cables 181, 181' (FIG. 9), one for each headlight 81, 81', connecting the battery 200 to the headlights 81,81' (FIG. 10).

In detail, each of these cables 181,181' passes at or near the median rolling axis of the quadrilateral 10, i.e., the rolling median hinge 101 or 102 of the respective cross member 11 or 12 to which the front-end fairing 50 is directly and rigidly connected. Therefore, if the fairing 50 is mounted integral with the upper cross member 12, as shown in FIG. 10, by means of the brackets 151 schematically shown, the median rolling hinge (through which the cables pass) is the upper hinge 102. Alternatively, if the fairing 50 is mounted integral with the lower cross member 11, the hinge is the lower one 101.

In this way, the passage of the electrical cables 181, 181' at the median rolling hinges 101 or 102, makes it possible to maintain an almost fixed length of the electrical cable with respect to the median hinge itself. In other words, the cable passing through the median hinge is not subject to length variations depending on the movement of the quadrilateral 10. Consequently, the cable keep a substantially fixed position, being subjected to no tensile, torsional or compressive forces generated by the deformation movements of the articulated quadrilateral during the driving phases of the vehicle.

In accordance with a preferred embodiment, the fairing 50 also supports two direction indicators 61, 61' arranged symmetrically with respect to the center plane A-A. According to the same principle as indicated several times above, also the direction indicators 61, 61' do not vary their orientation with respect to the support surface of the motor vehicle 1 during rolling of the motor vehicle 1.

In particular, also for the direction indicators 61'61, respective electrical supply cables 161,161' are provided for connecting them to the battery 200 (FIG. 10). Also said electrical supply cables 161,161' advantageously pass at or near the rolling median axis (rolling median hinges 101, 102) of the respective cross member 11,12 to which the front-end fairing 50 is directly and rigidly connected. Also for these electrical supply cables 161, 161', the same advantage as described above applies, i.e. passing through the median hinges they are not affected by the movements of the quadrilateral 10, thus maintaining a constant length with respect to the hinge.

In a possible embodiment variation, the direction indicators 61, 61' and/or the headlights 81, 81' could be directly connected to one of the two cross members 11, 12 through connection means completely independent of those that connect the fairing 50 to one of the two cross members 11, 12.

In addition to the advantages already indicated above, it can also be seen that the connection of the fairing 50 to one of the two cross members 11, 12 of the quadrilateral 10 increases the overall mass thereof and in general stabilises the front-end 3. In fact, the increased inertia of the quadrilateral 10, due to the fairing 50, counters the sussultatory movements of the front wheels 4, 4', which are reflected to a lesser extent on the frame, simplifying driving of the motor vehicle 1.

FIGS. 7 and 8 show a possible and therefore non-exclusive embodiment of a quadrilateral and a suspension assembly of a motor vehicle according to the present invention. In particular, said embodiment can be referred to the one described in the application EP1484239. By way of example, the quadrilateral and the suspension assembly of the motor vehicle could also assume one of the configurations shown and described in the patent applications IT102018000010942, IT102018000015908, IT102018000015911, WO2017/115273 or IT102018000015905.

In the solutions described and shown in the patent applications cited above, the quadrilateral can be defined as "high" since the configuration of the support elements and of the suspension assembly is such that the cross members remain in a position over the front wheels with respect to a lateral observation plane. However, the present invention can be implemented also when the quadrilateral mechanism is "low", i.e. such that the cross members remain substantially comprised between the two front wheels (again with respect to the same lateral observation plane) and in which the support elements and the suspension means are adjacent to the front wheels.

Therefore, the present invention could be implemented also when the quadrilateral, the support elements and the suspension means are carried out according to one of the solutions described and/or shown in the patent applications WO2018/104906, WO2020/065577, WO2018/007911, WO2018/172908, WO2017/115297, WO2017/021905, WO2017/021906, WO2017/115274, WO2017/017639 and WO2017/017636 also in the name of the Applicant.

The configuration of the steering assembly is not relevant for the purposes of the present invention. By way of example only, the steering assembly could assume one of the configurations described and/or shown in the patent applications WO2017/115296, WO2017/115274, WO2017/017636, WO2018/104862 and WO2018/172908 in the name of the Applicant.

The motor vehicle 1 according to the invention also comprises an anti-rolling device (not illustrated in the figures) to block, when activated, the relative movement between the quadrilateral mechanism 10 and the frame 2A-2B. Also the configuration of the anti-rolling device is not relevant for the present invention. Solely by way of example, if the suspension means (in particular the shock absorbers) were at least partially integrated in the structure of the uprights, the anti-rolling device could assume, merely by way of example, one of the configurations described and/or shown in the patent applications WO2017/115293, WO2017/115296, WO2017/115295 and WO2017/115294 in the name of the Applicant. If, on the other hand, the suspension means of the front wheels were interposed between the uprights and the wheels (i.e. according to a solution conceptually analogous to the one shown in the attached FIGS. 9 to 12A) then the anti-rolling device could assume other embodiments such as, for example, those shown and/or described in the patent applications WO2018/116210, WO2018/116214, WO2018/158743 and WO2018/116211 again in the name of the Applicant.

In accordance with a possible embodiment, the motor vehicle 1 comprises a dashboard 150 that includes at least an odometer. Said dashboard 150 (indicated in FIG. 4) is connected to the frame 2A-2B so as to roll together with the frame, i.e. so as to follow the rolling movements of the motor vehicle 1.

In accordance with an embodiment, shown in FIGS. 4 to 6, the motor vehicle 1 comprises a windscreen 160 connected to the frame 2A-2B so as to roll together with the frame as can be seen by comparing FIGS. 5 and 6. In particular, from FIG. 6 it can be seen that during the rolling phase, the windscreen 160 tilts, according to the rolling movement, with respect to the front fairing 50 that keeps the same orientation with respect to the support surface PO of the motor vehicle 1. In accordance with this embodiment, the windscreen 160 is therefore free from the front fairing 50. In this way, the windscreen 160 can exercise its function of protecting the rider in any condition of motion of the motor vehicle 1.

With reference to FIG. 4, in a possible embodiment variation, the height (indicated by H3) of the fairing 50 is lower than the height (indicated by H4) of the top of the handlebar 66 of the motor vehicle 1, wherein said heights H3, H4 are considered with respect to the surface PO of the motor vehicle 1 and in its condition of "straight wheels" (motor vehicle in erect position). More precisely, the expression "height H3 of the fairing 50" indicates the distance (measured along the vertical) of the point of the fairing 50 farthest from the support surface PO. The expression "top of the handlebar" indicates the farthest point of the handlebar 66 from the support surface PO.

In accordance with a possible embodiment that can be seen in FIG. 4, the front fairing 50 defines a housing 55 to contain objects, preferably a helmet 58. For this purpose, the fairing 50 comprises a movable part 56 to allow access to the housing 55. As indicated in FIG. 4, said openable part 56 can be configured as a door, therefore hinged to the rest of the fairing 50, so that it can assume a closing position or an opening position respectively to prevent or allow access to the housing 55.

Alternatively, the openable part 56 could be configured so that it can be removed and subsequently reconnected to the front fairing 50. In any case, locking means (for example a lock) can be provided to lock the movable part 56 in the position in which it closes the housing 55.

The technical solutions described above allow the predefined tasks and objects to be fully achieved.

The invention claimed is:
1. A saddle-riding type motorcycle comprising:
at least two front wheels and at least one drive wheel;
a frame;
a motor assembly supported by a rear part of the frame;
an articulated rolling quadrilateral connected to a front part of the frame and configured to support a first front wheel and a second front wheel, respectively, so as to allow rolling movement of the first front wheel and the second front wheel;
a steering assembly configured to steer the front wheels;
a suspension assembly interposed between the front wheels and the articulated rolling quadrilateral to allow sussultatory movement of the front wheels with respect to the articulated rolling quadrilateral;
wherein the articulated rolling quadrilateral comprises a lower cross member and an upper cross member hinged to the front part of the frame so as to oscillate about median rolling axes that are parallel and substantially lying on a center plane of the motor vehicle, and a first upright and a second upright hinged to the lower and upper cross members so as to rotate about further rolling axes parallel to the median rolling axes; and
a front fairing directly and rigidly connected to one of the lower and upper cross-members of the articulated rolling quadrilateral, wherein the front fairing comprises wheel arch portions arranged above the front wheels.

2. The motorcycle of claim 1, comprising an electric energy source directly or indirectly connected to the frame, wherein the front fairing supports at least one headlight so that the headlight follows the movements of the one of the lower and upper cross-members to which the fairing is connected, and wherein at least an electric cable connects the electric energy source to the headlight.

3. The motorcycle of claim 2, wherein the electric cable passes at or near the median rolling axes of the respective cross member to which the front fairing is directly and rigidly connected.

4. The motorcycle of claim 1, wherein the fairing comprises two direction indicators.

5. The motorcycle of claim 4, wherein respective supply electrical cables are provided to connect the direction indicators to the electric energy source, the supply electrical cables passing at or near the rolling axes of the one of the lower and upper cross-members to which the fairing is connected.

6. The motorcycle of claim 1, wherein the front fairing is cantileveredly connected to the one of the lower and upper cross-members to which the fairing is connected via a connecting frame.

7. The motorcycle of claim 1, wherein the front fairing is exclusively connected to the one of the lower and upper cross-members to which the fairing is connected.

8. The motorcycle of claim 1, wherein a dashboard comprising an odometer is connected to the frame so as to roll therewith.

9. The motorcycle of claim 1, wherein a windscreen is connected to the frame so as to roll therewith.

10. The motorcycle of claim 1, wherein a first height from the ground of the front fairing, when the motor vehicle is in an upright position, is less than a second height of a top of a handlebar of the motor vehicle, wherein the first and second heights are considered from a support plane of the motor vehicle.

11. The motorcycle of claim 1, wherein the front fairing comprises a housing for holding objects.

12. The motorcycle of claim 11, wherein the housing is configured for holding a helmet.

13. The motorcycle of claim 1, wherein a distance between the front fairing and the front wheels is exclusively a function of a stroke allowed by the suspension assembly.

14. The motorcycle of claim 1, wherein the front fairing is a rigid covering or a shell configured to reduce the motorcycle's resistance to air when in motion.

* * * * *